(12) United States Patent
Whitney et al.

(10) Patent No.: US 8,374,106 B2
(45) Date of Patent: Feb. 12, 2013

(54) METHOD AND APPARATUS FOR GROUP CALLING IN AN IP-BASED COMMUNICATION SYSTEM

(75) Inventors: Morgan Whitney, Denver, CO (US);
Lee Gonzales, Denver, CO (US); John Mathew, Emerson, NJ (US); Michael Komitee, Hoboken, NJ (US); Michael Decandia, Middletown, NJ (US)

(73) Assignee: Vonage Network LLC, Holmdel, NJ (US)

( * ) Notice: Subject to any disclaimer, the term of this patent is extended or adjusted under 35 U.S.C. 154(b) by 824 days.

(21) Appl. No.: 12/316,888

(22) Filed: Dec. 16, 2008

(65) Prior Publication Data

US 2010/0150030 A1 Jun. 17, 2010

(51) Int. Cl.
*H04L 12/16* (2006.01)
*H04L 12/66* (2006.01)
*H04Q 11/00* (2006.01)
*H04M 3/42* (2006.01)

(52) U.S. Cl. ........ 370/260; 370/352; 370/259; 370/261; 379/201.01; 379/202.01

(58) Field of Classification Search .................. 379/221, 379/202.01, 219, 201.01; 370/260, 352, 370/259, 261; 455/414.1, 416, 518, 519
See application file for complete search history.

(56) References Cited

U.S. PATENT DOCUMENTS

| | | | |
|---|---|---|---|
| 7,010,107 B1 | 3/2006 | Lee et al. | |
| 2002/0143876 A1 | 10/2002 | Boyer et al. | |
| 2008/0165944 A1* | 7/2008 | Rosenthal et al. | 379/202.01 |
| 2009/0296608 A1* | 12/2009 | Khan et al. | 370/260 |
| 2010/0124321 A1* | 5/2010 | Alexandrov et al. | 379/202.01 |
| 2011/0182212 A1* | 7/2011 | Smelyansky et al. | 370/260 |

OTHER PUBLICATIONS

Architectural Styles and the Design of Network-based Software Architectures; Roy. T. Fielding, 2000.
Internet Engineering Task Force RFC3261, "SIP: Session Initiation Protocol", J. Rosenberg et al., Jun. 2002.

* cited by examiner

*Primary Examiner* — Thjuan K Addy
(74) *Attorney, Agent, or Firm* — Duane Morris LLP; Joseph Pagnotta; Patrick C. Muldoon

(57) ABSTRACT

Method and system for group calling in an IP-based communication system includes receiving an administrator identifier, receiving one or more invitee identifiers, initiating a first connection from a central location and initiating at least one or more second connections from the central location to join an administrator and at least one invitee. The administrator identifier and one or more invitee identifiers can be a telephone number or other identifiers associated with the communication system. To establish the group call, the administrator identifier and one or more invitee identifiers are received from the administrator. The first connection initiation is to the administrator and the second or more connection initiations are to the at least one invitee. System for making a group call includes a user interface adapted for use by the administrator, a database manager, a database, a load balancer and a group calling pool adapted for SIP-based group call setup.

20 Claims, 4 Drawing Sheets

METHOD AND APPARATUS FOR GROUP CALLING IN AN IP-BASED COMMUNICATION SYSTEM

FIELD OF THE INVENTION

The invention is related to the field of telecommunication devices and services and more specifically, the invention is directed to an apparatus (system) and method that provides customers of a telecommunication system based on Voice over Internet Protocol (VoIP) with the ability to perform a group calling function.

BACKGROUND OF THE INVENTION

VoIP is a technological development in the field of telecommunications that is utilized to transmit voice conversations over a data network using Internet Protocol (IP) rather than the existing and traditional telecommunications system more commonly referred to as the Public Switched Telephone Network (PSTN) or Plain Old Telephone Service (POTS). Entities (e.g., businesses or individuals) implement VoIP by purchasing and installing the necessary equipment (e.g., one or more Customer Premise Equipment (CPE) devices) to access a VoIP service provider and activating this telecommunication service via a broadband connection.

Since VoIP is a relatively new technology in terms of its commercial penetration, there are many PSTN-originated telecommunication features that new VoIP subscribers may desire or expect so as to mimic the existing technology. One such feature is group or conference calling where it is possible to connect multiple parties calling from multiple phone lines into a single communication session. It is possible for VoIP to duplicate the "feel" of a conference call (where callers each dial in to a conference bridge (in the form of a server or similar type of computer processing device) and are subsequently connected to each other to form the communication session). However, this places a burden on each caller to obtain a communication session or main access number to the conference bridge device and perform dial-in and login/security actions to become part of the desired communication session. There is also a further burden on the conference call administrator (the individual who is planning or otherwise hosting the conference call) to initially purchase, install or otherwise provide for the necessary infrastructure to carry out the conference call and subsequently disseminate the above-identified dial-in and login information prior to the scheduled time of the conference call. These administrative hurdles detract from the overall experience of group communications. With the advent of web-based applications, it has become easier for data to be shared among an increasing number of users. However, there is a lack of integration of PSTN-style conference or group calling and web-based applications to facilitate this type of communication via the Internet.

Accordingly, there is a need in the art for an apparatus and method for providing VoIP subscribers with the ability to perform conference calling via a web-based interface to improve the overall experience.

SUMMARY OF THE INVENTION

The disadvantages associated with the prior art are overcome by a method and system for group calling in an IP-based communication system. The method includes the steps of receiving a group call administrator identifier, receiving one or more group call invitee identifiers, initiating a first group call connection from a central location and initiating at least one or more second group call connections from the central location to join a group call administrator and at the least one group call invitee. The group call administrator identifier and one or more group call invitee identifiers can be a telephone number or other identifiers associated with users of the communication system. To establish the group call, the group call administrator identifier and one or more group call invitee identifiers are received from the group call administrator. The first group call connection initiation is to the group administrator and the second or more group call connection initiations are to the at least one group call invitee. The central location for the first group call connection initiation and the second or more group call connection initiations is the VoIP service provider equipment. The step of receiving a group call administrator identifier occurs via a first internet connection between a group call administrator and a VoIP service provider. The step of receiving one or more group call invitee identifiers also occurs via a first internet connection between a group call administrator and a VoIP service provider. In one embodiment of the invention, the method is practiced by a computer readable medium storing a software program that, when executed by a computer and being initiated in response to a communication request placed via an interface of a VoIP service subscriber, causes the computer to perform an operation of VoIP-based group calling as described above.

A system for making a VoIP-based group call includes a user interface adapted for use by a group call administrator via the Internet, a database manager connected to the user interface, a database connected to the database manager, a group call load balancer connected to the user interface and a group calling pool adapted for SIP-based group call setup. The user interface further comprises a first field for receiving a group call administrator identifier and at least one second field for receiving one or more group call invitee identifiers. In one embodiment of the invention, the group call administrator identifier and one or more group call invitee identifiers is a telephone number. The group calling pool includes a plurality of servers wherein each server responds to one group call request made by the group call administrator. Each server responds to a group call request by initiating a first group call connection and initiating at least one or more second group call connections to join a group call administrator and at least one group call invitee.

BRIEF DESCRIPTION OF THE FIGURES

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
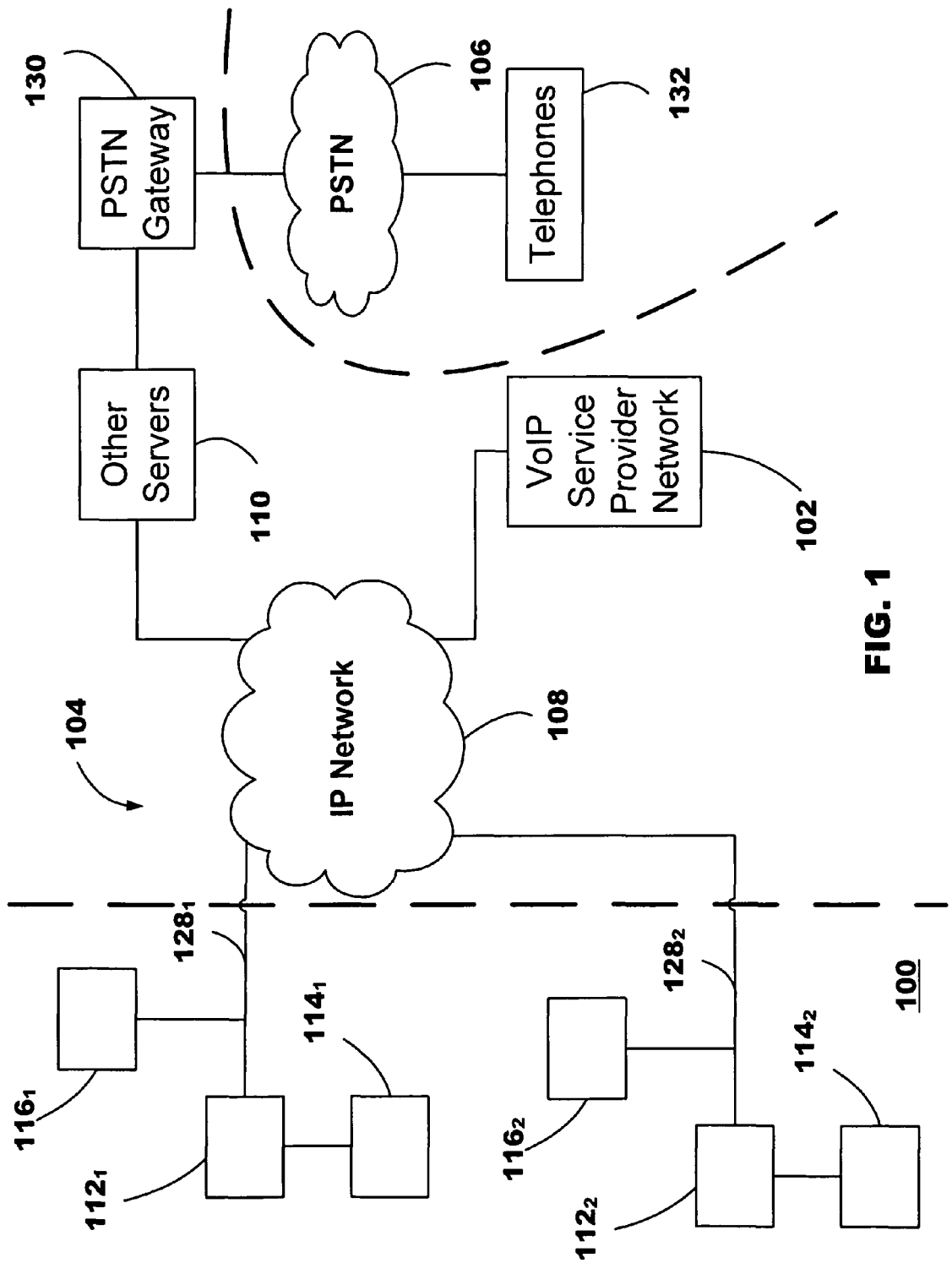
FIG. 1 is a block diagram depicting an exemplary embodiment of a VoIP-based, group calling enabled communication system in accordance with the subject invention.

To facilitate understanding, identical reference numerals have been used, where possible, to designate identical elements that are common to the figures.

To achieve the desired objectives, the subject invention provides IP-based telecommunication services (i.e., VoIP) subscribers with the ability to initiate advanced call features associated with the service such as, but not limited to, group or conference calling. Real-time management and control of the features are executed by a system in an IP-based environment (i.e., the Internet) via one or more interfaces. Since both the telecommunication service and the management system operate over IP, the limitations associated with a PSTN telecommunication service are overcome and full exploitation of broadband capabilities are enjoyed to improve the overall experience.

In a preferred embodiment of the invention, the management functions operate as part of a larger VoIP telecommunication service. Such telecommunication service is, by way of example, part of any public or private data network (or combination thereof) constructed for (in part) and adapted to convert analog voice signals (e.g., generated by a human utterance) to a digitized and packetized format according to known and understood protocols (such as but not limited to Transmission Control Protocol/Internet Protocol (TCP/IP)) for transmission from an originating point (Party A) to one or more terminating points (Party B and/or C, D and the like). In a preferred embodiment of the invention, the data network is an IP-based network such as (but not limited to) the Internet having VoIP specific and related components connected thereto.

FIG. 1 is a block diagram depicting an exemplary embodiment of a communication system 100 in accordance with one or more aspects of the invention. The communication system 100 includes a voice-over-internet-protocol (VOIP) network 104 and (optionally) a public switched telephone network (PSTN) 106. The VOIP network 104 includes a VoIP Service Provider Network 102 and a plurality of VoIP-service related servers 110 coupled to an internet protocol (IP) network 108. The servers 110 may be various well known servers configured to facilitate VOIP services, such as provisioning servers, proxy servers, media relay servers, and the like including but not limited to additional servers described below regarding specifics of the subject invention. The VoIP Service Provider Network 102 is configured to provide the necessary infrastructure and call processing capabilities to set up, execute and tear down VoIP communication sessions. The VoIP Service Provider Network 102 and servers 110 may be implemented using a plurality of computer systems and like type general and/or specific purpose devices and systems. The one or more of the servers 110 may be coupled to a PSTN gateway 130, which in turn is coupled to the PSTN 106. The PSTN 106 provides conventional telephone service to a plurality of telephones 132.

Various customer premises equipment (CPE) 112n are coupled to the IP network 108 via links 128n. Various communication devices 114n can be coupled to the CPE 112n. The CPE 112n may include modems, terminal adapters, routers, and the like configured to provide an interface between the communication devices 114n and the IP network 108. The communication devices 114n can comprise telephones, video phones, computers, mobile devices, and the like. The CPE 112n and the communication devices 114n can be distributed among a plurality of subscribers to VOIP services provided by the VOIP network 104. The links 128n can include cable, fiber optic, digital subscriber line (DSL), or like type communication links known in the art.

In general operation, subscribers use the communication devices 114n and the CPE 112n to covert content (e.g., voice, video, data, some or all of which may be analog) and signaling into VOIP-based content and signaling ("a VOIP call"). VOIP calls can be transmitted to the IP network 108 via the CPE 112n over the links 128n. Those skilled in the art will appreciate that the VOIP calls may pass through other IP networks before reaching the IP network 108 of the VOIP network 104. For example, the VOIP calls may pass through various IP networks of the Internet before being routed to the IP network 108 (e.g., internet service provider (ISP) networks, backbone networks, etc.). VOIP calls may be processed by the servers 110. VOIP calls in general and those of a conference call or group call nature as described in further detail below can be directed to other subscribers of the VOIP network 104, to subscribers of other VOIP networks (not shown), or to subscribers of traditional telephone services (e.g., the PSTN 106).

Generally, when a subscriber activates their service (i.e., a VoIP service), they have access to a number of features, such as but not limited to call features like call waiting, call forwarding, do not disturb, caller ID, and the like. Additionally, the subscriber can have access to other IP-based services, such as instant messaging, email, and the like. Tying services and features together adds to the flexibility and pervasiveness of the services in general so that their adoption becomes increasingly widespread. In some embodiments, the VoIP network 104 provides a method and apparatus for managing and establishing group calls so that subscribers can create and schedule such calls with a minimum of interaction and preparation by all involved parties of the group as well as minimizing the cost associated with the required infrastructure to perform such group calls. The group calling feature can be facilitated by the VoIP Service Provider Network 102. For clarity, only a single element is shown for the VoIP Service Provider Network 102. Those skilled in the art will appreciate that the VoIP Service Provider Network 102 can include more than one element interconnected to various other elements/components to achieve the desired result.

Figure 2:
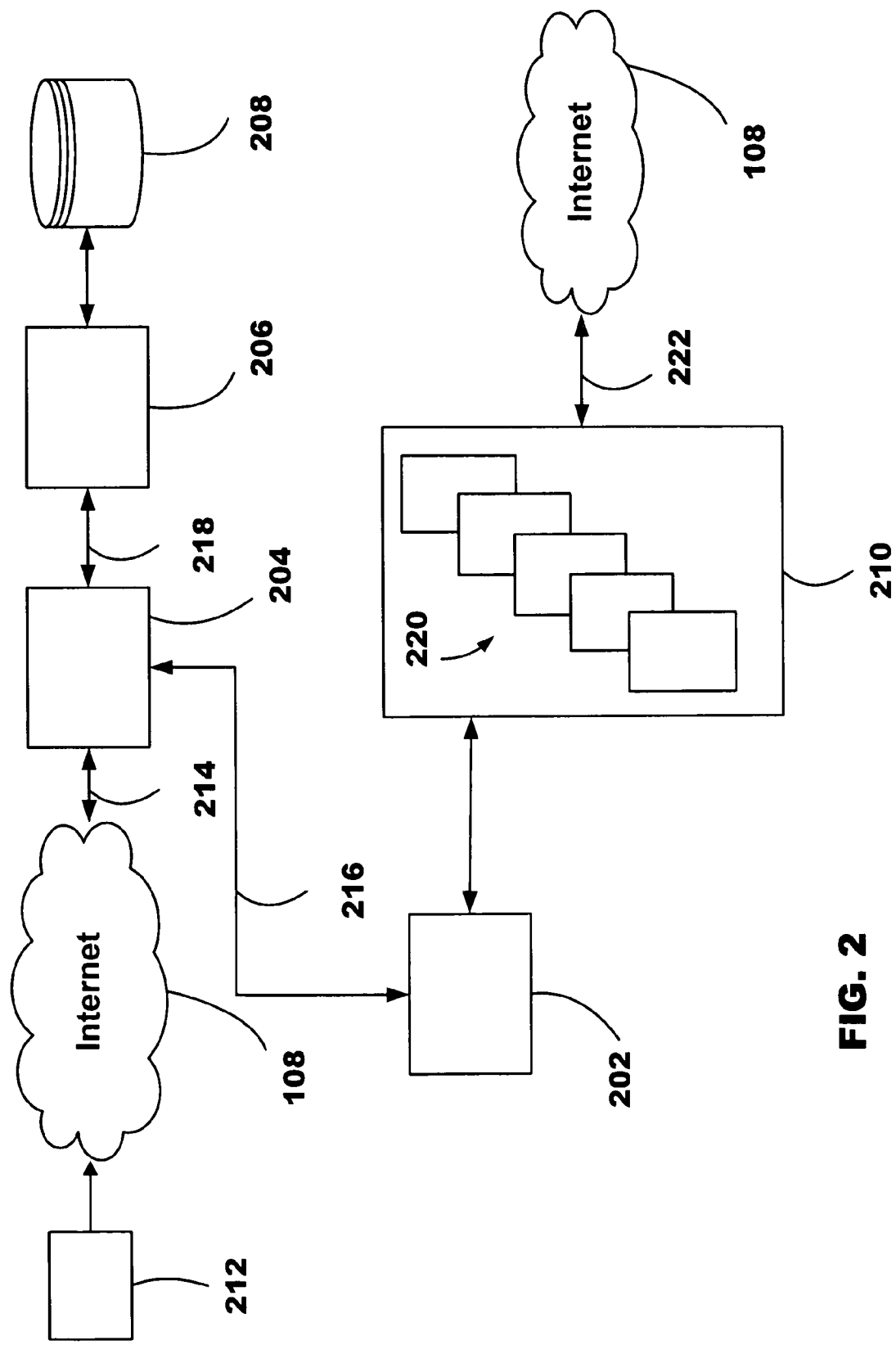
FIG. 2 is a schematic diagram of a group calling system within the VoIP-based communication system in accordance with the subject invention.

FIG. 2 is a schematic diagram of a group calling system (GCS) 200 within the VoIP Service Provider Network 102 in accordance with the subject invention. Generally, the GCS 200 is a plurality of servers 202, 204, 206 having specific functionality and roles in the group calling process, a database 208 for retaining information relevant to the group calling process and a pool of group call processors (GCP) 210 for fulfilling group call requests. Note that while the GCS 200 depicts connection to a packet-based network such as the Internet 108, such network is exemplary in nature and not part of the specific invention. Connection to other packet-based networks are possible and within the scope of the invention.

A first server 204 of the plurality of servers functions as a user interface (UI). That is, the first server/UI 204 provides the graphical, audio, video and other related capabilities to create an interface between VoIP subscriber equipment 212 and the GCS 200. The VoIP subscriber equipment includes but is not limited to the CPE 112n, Communication Devices 114n and computers 116n described above with respect to FIG. 1. In one embodiment of the invention, the UI has the look and feel of a directory of names that are part of the VoIP subscriber's list of contacts. The directory may show all or part of the total number of contacts (depending on a display screen size (also part of VoIP subscriber equipment 212) and configuration that is driven by the UI, number of total contacts or user organizational preferences (i.e., alphabetical, groups, sub-groups and the like)). Interaction between the first server/UI 204 and the VoIP subscriber is enabled via a first connection 214 of the first server/UI 204 to a packet-based network such as the Internet 108. In one embodiment of the invention, the first connection 214 is a Hyper Text Transfer Protocol (HTTP) as is commonly known in the art of packet-based network communications. In a preferred embodiment of the invention, the UI 204 is created and executed using a Ruby on Rails-based application using RESTful communication on a Red Hat LINUX® platform running on IBM hardware although the UI 204 is operable on other combinations of software and hardware including MICROSOFT® WINDOWS® running on compatible devices.

The first server/UI 204 is further connected to a second server 202 via a second connection 216 and a third server 206 via a third connection 218. In one embodiment of the invention, the second and third connections 216 and 218 are via HTTP using the Representational state transfer (REST) style of software architecture. REST is more fully disclosed in "Architectural Styles and the Design of Network-based Software Architectures" by Roy Thomas Fielding, 2000 herein incorporated by reference.

The second server 202 functions as a Load Balancer for the GCP 210 as described in greater detail below. Generally, the second server/Load Balancer 202 assigns group calling tasks to specific pool "members" 220 of the GCP 210 and maintains the state of calls and requests. In one embodiment of the invention, the second server/Load Balancer 202 is created on a Red Hat LINUX® platform running on IBM hardware although same is operable on other combinations of software and hardware including MICROSOFT® WINDOWS® running on compatible devices.

The third server 206 functions as a Manager for the database 208. That is, information is maintained in the database 208 in order to execute group calling functions based on VoIP subscriber requests. The third server/Manager 206 acts as an abstraction layer for the database 208 in order to relay the requested information from the database 208 to the second server/Load Balancer 202 and GCP 210. In a preferred embodiment of the invention, the third server/Manager 206 is created and its tasks executed by using a Ruby on Rails-based application using RESTful communication on a on a Red Hat LINUX® platform running on IBM hardware although the UI 204 is operable on other combinations of software and hardware including MICROSOFT® WINDOWS® running on compatible devices.

The GCP 210 further comprises a plurality of group call servers 220 (pool members) for responding to group call setup requests by the VoIP subscriber as identified above. Each group call server 220 processes one group call request. As a group call request is processed, the appropriate group call session set up process is executed via a fourth connection 222 between the GCP 210 and a packet-based network such as the Internet 108. In one embodiment of the invention, Session Initiation Protocol (SIP) is used as the connection protocol to execute the group call session set up (and subsequent tear down) steps. SIP is a signaling protocol for initiating, managing and terminating media (e.g., voice, data and video) sessions across packet based networks that typically use the Internet Protocol (IP) of which VoIP is an example. The details and functionality of SIP can be found in the Internet Engineering Task Force (IETF) Request for Comments (RFC) Paper No. 3261 entitled, "SIP: Session Initiation Protocol" herein incorporated in its entirety by reference. As the number of group call requests fluctuates (based on the rate of new group call requests/session set ups and conclusion of group calls/session tear downs), the second server/Load Balancer 202 manages the GCP 210 to optimize call flow. In one embodiment of the invention, this management process is performed via open source software and preferably using ASTERISK® v1.2.14. ASTERISK® is an open source product created by Digium, Inc. of Huntsville, Ala. and released under the GNU General Public License (GPL). In a preferred embodiment of the invention, each of the plurality of group call servers 220 is created on a Red Hat LINUX® platform running on IBM hardware although same is operable on other combinations of software and hardware including MICROSOFT® WINDOWS® running on compatible devices.

Figure 3:
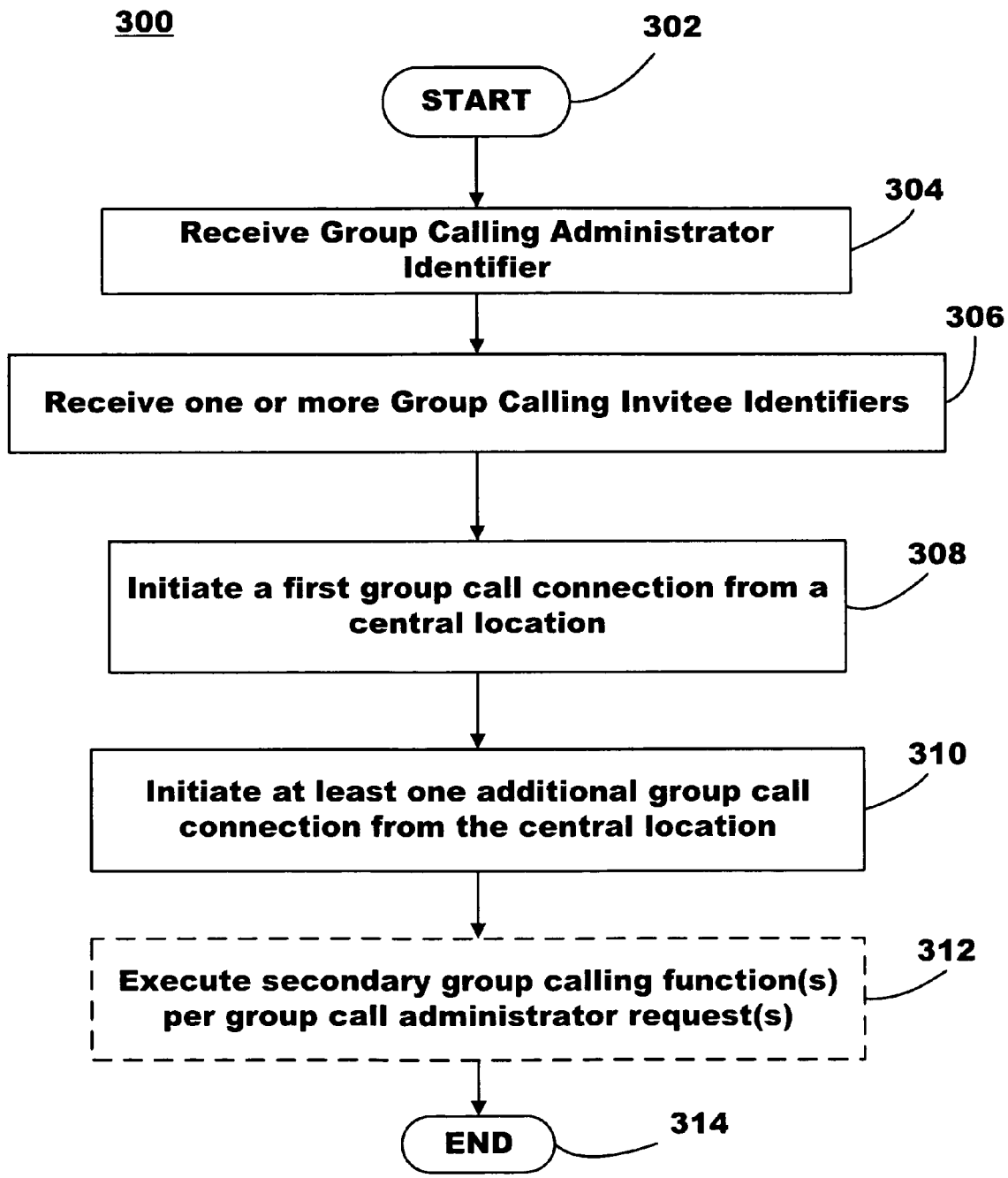
FIG. 3 is a flowchart depicting a method of group call processing in accordance with the subject invention.

FIG. 3 depicts a series of method steps 300 for performing group calling in an IP-based communication system in accordance with the subject invention. The method is, in one embodiment of the invention, practiced in the GCS 200 as introduced and described above to create a "bridgeless" conference call system. The group calling method 300 starts at step 302 and proceeds to step 304 where a group calling administrator identifier is received. For example, a VoIP subscriber desires to establish a group calling session between himself and at least two other parties. As such, he accesses the GCS 200 (via first server/UI 204, "calling" or invoking the GCS 200) and activates a Group Calling feature available therethrough. As a result, information identifying the VoIP subscriber as the group call administrator will be sent to and subsequently received by the GCS 200. The group call administrator identifier is selected from the group of possible identifiers consisting of VoIP subscriber user name, VoIP subscriber account number, VoIP subscriber instant messaging identifier, VoIP subscriber telephone number and other authorized subscriber telephone number (i.e., a telephone number that is not necessarily provided or assigned by the VoIP provider). Other identifiers are possible and are known to those skilled in the art.

At step 306, one or more group calling invitee identifiers is received. For example, a VoIP subscriber (after having identified himself as the group calling administrator as described above) desires to establish a group calling session between himself and at least one other party. As such, he continues to access the GCS 200 (via first server/UI 204) and selects one or more group calling invitees available therethrough. As a result, information identifying the one or more selected group calling invitees will be sent to and subsequently received by the GCS 200. The group call invitee identifier is selected from the group of possible identifiers consisting of contact name of invitee given by VoIP subscriber, group call invitee telephone number, VoIP subscriber instant messaging identifier, VoIP subscriber telephone number and other authorized subscriber telephone number (i.e., a telephone number that is not necessarily provided or assigned by the VoIP provider). Other identifiers are possible and are known to those skilled in the art. Note that there can be up to n invitees where n is limited by the number of group call participants that can be supported by the system architecture and hardware.

At step 308, a first group call connection is initiated from a central location. More particularly and in one embodiment of the invention, once the GCS 200 has all of the necessary information to initiate a group call (namely an administrator identifier and two or more invitee identifiers), the GCS 200 attempts to make the group call in accordance with the VoIP subscriber's request. The group call starts with the GCS 200 placing a call to the administrator who has identified himself as such earlier. For example, one of the servers from the group calling server pool 220 begins executing a group calling session set up by calling the administrator. If the administrator answers the call (i.e., picks up his phone to place it in an "off-hook" condition), the GCS 200 receives acknowledgement that the group call administrator has accepted the group call session request. If the administrator does not answer the call, the GCS 200 tears down the group call session to free up the group call server 220 and allow it to service another group call request.

At step 310, at least one additional group call connection is initiated from a central location. More particularly and in one embodiment of the invention, once the group call administrator has accepted the group call session request from the GCS 200, the GCS 200 attempts to finalize the group call session set up in accordance with the VoIP subscriber's request. The GCS 200 places a call to the at least one group call invitee that the administrator had identified earlier. For example, the server 220 from the group calling server pool that initiated the first group call connection continues the group calling session set up by calling the at least one group call invitee. If at least one of the group call invitee(s) answers the call (i.e., picks up his phone to place it in an "off-hook" condition), the GCS 200 receives acknowledgement that the group call invitee has accepted the group call session request and connects such invitee(s) to the administrator and other accepted invitees. That is, even if only two parties comprise the group call, (appearing to be a "regular phone call" between two parties), the GCS 200 maintains the call with all attendant features and functionality of a group call as discussed above.

At step 312, one or more group calling secondary functions are optionally executed. Specifically, once the group call is initiated, there may be circumstances where call control features have to be invoked by the group call administrator during the group call in order to achieve the desired results. Such call control features are executable in real time (i.e., during the group call) via the first server/UI 204 for real time modification of the user experience. In one embodiment of the invention, the group call administrator accesses the first server/UI 204 and requests modification, initiation or termination of a group call feature therethrough while maintaining basic group call dynamics. The request can be made via manipulation of a graphical icon, performing a drag and drop operation of old/new group call attendees from/to the group call or other operations known to those skilled in the art. Non-limiting examples of group calling features that can be managed in real time are selected from the group consisting of mute/unmute call participants, invoking re-invite requests to one or more parties and removing one or more parties from an existing group call although other features are additionally contemplated. The benefits of such capabilities include being able to view the status of these optional features (and the group call in general) in real time via the UI 204. The method ends at step 314.

Figure 4:
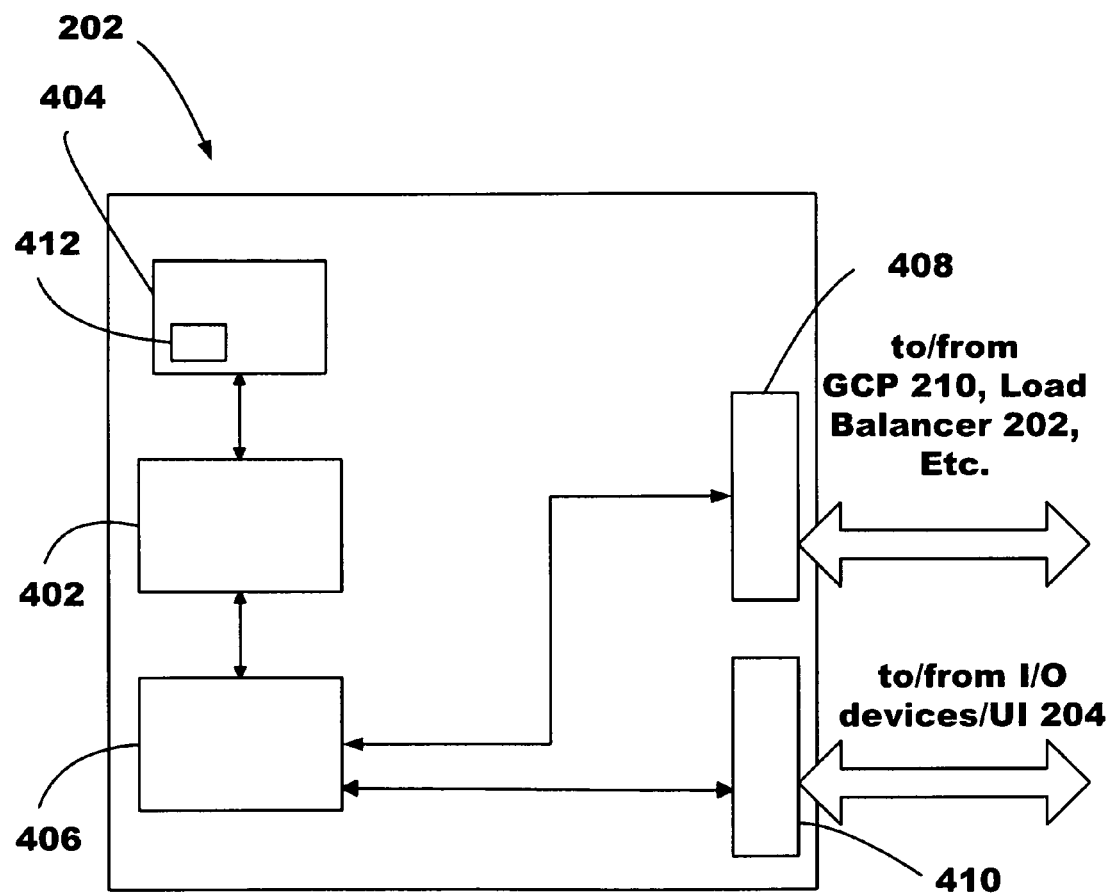
FIG. 4 is a schematic diagram of a controller that may be used to practice one or more embodiments of the subject invention.

FIG. 4 depicts a schematic diagram of a controller 400 that may be used to practice the present invention. The controller 400 may be used to facilitate establishment of the UI created by server 204 and process the group call requests within the GCS 200 as described above. The controller 400 may be one of any form of a general purpose computer processor used in accessing an IP-based network such as a corporate intranet, the Internet or the like. The controller 400 comprises a central processing unit (CPU) 402, a memory 404, and support circuits 406 for the CPU 402. The controller 400 also includes provisions 408/410 for connecting the controller 400 to the first server/User Interface 204 and system components such as but not limited to the Load Balancer 202 and the Group Calling Pool 210 and one or more input/output devices (not shown) for accessing the controller 400 and/or performing ancillary or administrative functions related thereto. Note that the provisions 408/410 are shown as separate bus structures in FIG. 4; however, they may alternately be a single bus structure without degrading or otherwise changing the intended operability of the controller 400 or invention in general. Additionally, the controller 400 and its operating components and programming as described in detail below are shown as a single entity; however, the controller may also be one or more controllers and programming modules interspersed around the GCS 200 each carrying out a specific or dedicated portion of the diagnostic analysis as described earlier. By way of non-limiting example, a portion of the controller 400 or software operations may occur at the Load Balancer 202 and another a portion of the controller 400 or software operations may occur at the Group Calling Pool 210. Other configurations of the controller and controller programming are known and understood by those skilled in the art.

The memory 404 is coupled to the CPU 402. The memory 404, or computer-readable medium, may be one or more of readily available memory such as random access memory (RAM), read only memory (ROM), floppy disk, hard disk, flash memory or any other form of digital storage, local or remote. The support circuits 406 are coupled to the CPU 402 for supporting the processor in a conventional manner. These circuits include cache, power supplies, clock circuits, input/output circuitry and subsystems, and the like. A software routine 412, when executed by the CPU 402, causes the controller 400 to perform processes of the present invention and is generally stored in the memory 404. The software routine 412 may also be stored and/or executed by a second CPU (not shown) that is remotely located from the hardware being controlled by the CPU 402.

The software routine 412 is executed when the disclosed method of processing group call requests is desired. The software routine 412, when executed by the CPU 402, transforms the general purpose computer into a specific purpose computer (controller) 400 that controls the various servers and GCS 200 in general or other similar actions. Although the process of the present invention is discussed as being implemented as a software routine, some of the method steps that are disclosed therein may be performed in hardware as well as by the software controller. As such, the invention may be implemented in software as executed upon a computer system, in hardware as an application specific integrated circuit or other type of hardware implementation, or a combination of software and hardware. The software routine 412 of the present invention is capable of being executed on computer operating systems including but not limited to Microsoft Windows 98, Microsoft Windows XP, Apple OS X and LINUX. Similarly, the software routine 412 of the present invention is capable of being performed using CPU architectures including but not limited to Apple Power PC, Intel x86, Sun service provider agentRC and Intel ARM.

While foregoing is directed to embodiments of the present invention, other and further embodiments of the invention may be devised without departing from the basic scope thereof, and the scope thereof.

What is claimed is:

1. Method for making a VoIP-based group call comprising:
 receiving a group call administrator identifier;
 receiving one or more group call invitee identifiers;
 initiating a first group call connection from a central location and
 initiating at least one or more second group call connections from the central location to join a group call administrator and at the least one group call invitee.

2. The method of claim 1 wherein the group call administrator identifier is a telephone number.

3. The method of claim 2 wherein the one or more group call invitee identifiers are telephone numbers.

4. The method of claim 1 wherein the group call administrator identifier and one or more group call invitee identifiers are received from the group call administrator.

5. The method of claim 1 wherein the first group call connection initiation is to the group administrator.

6. The method of claim 1 wherein the second or more group call connection initiations are to the at least one group call invitee.

7. The method of claim 1 wherein the central location for the first group call connection initiation is VoIP service provider equipment.

8. The method of claim 1 wherein the central location for the second or more group call connection initiations is VoIP service provider equipment.

9. The method of claim 1 wherein the step of receiving a group call administrator identifier occurs via a first internet connection between a group call administrator and a VoIP service provider.

10. The method of claim 1 wherein the step of receiving one or more group call invitee identifiers occurs via a first internet connection between a group call administrator and a VoIP service provider.

11. System for making a VoIP-based group call comprising:
   a user interface adapted for use by a group call administrator via the Internet;
   a database manager connected to the user interface;
   a database connected to the database manager;
   a group call load balancer connected to the user interface;
   a group calling pool adapted for SIP-based group call setup.

12. The system of claim 11 wherein the user interface further comprises a first field for receiving a group call administrator identifier and at least one second field for receiving one or more group call invitee identifiers.

13. The system of claim 12 wherein the group call administrator identifier is a telephone number.

14. The system of claim 12 wherein the one or more group call invitee identifiers are telephone numbers.

15. The system of claim 12 wherein the group calling pool further comprises a plurality of servers.

16. The system of claim 15 wherein each server responds to one group call request made by the group call administrator.

17. The system of claim 16 wherein each server responds to a group call request by initiating a first group call connection and initiating at least one or more second group call connections to join a group call administrator and at least one group call invitee.

18. A non-transitory computer readable medium storing a software program that, when executed by a computer and being initiated in response to a communication request placed via an interface of a VoIP service subscriber, causes the computer to perform an operation of VoIP-based group call comprising: receiving a group call administrator identifier; receiving one or more group call invitee identifiers; initiating a first group call connection from a central location and initiating at least one or more second group call connections from the central location to join a group call administrator and at the least one group call invitee.

19. The computer readable medium of claim 18 wherein the first group call connection initiation is to the group administrator.

20. The computer readable medium of claim 18 wherein the second or more group call connection initiations are to the at least one group call invitee.

* * * * *